(No Model.) 2 Sheets—Sheet 1.

A. & J. HINMAN.
SEEDING MACHINE.

No. 348,213. Patented Aug. 31, 1886.

Witnesses:
Chas. J. Buchheit.
Theodore L. Popp.

Inventors:
Albert Hinman
Jesse Hinman
By Wilhelm Bonner
Attorneys.

(No Model.) 2 Sheets—Sheet 2.
A. & J. HINMAN.
SEEDING MACHINE.
No. 348,213. Patented Aug. 31, 1886.
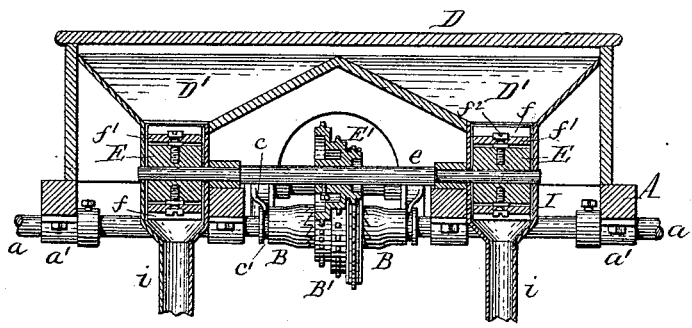
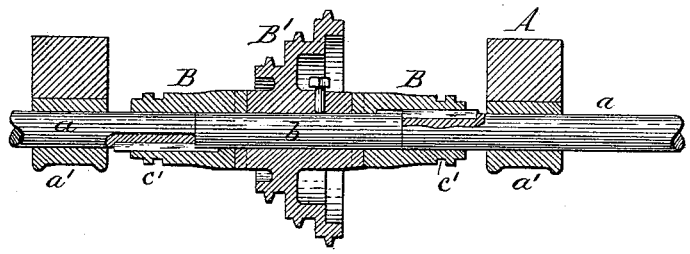
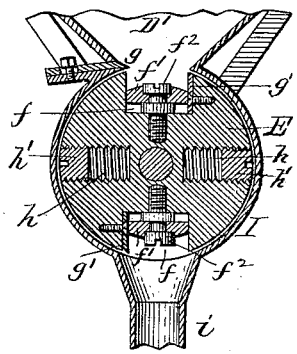
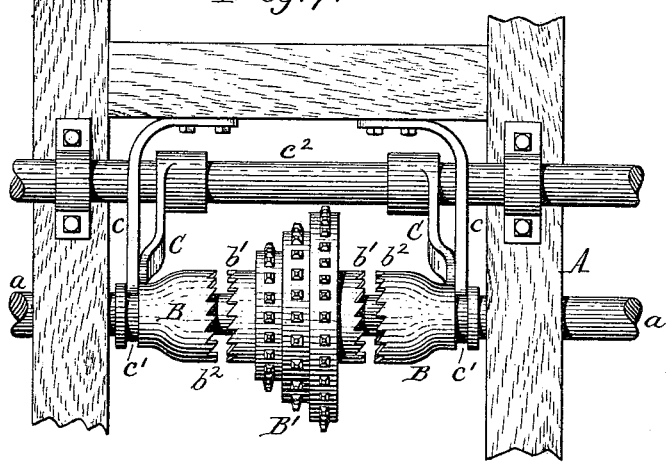
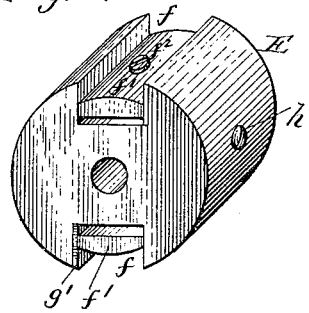
Witnesses:
Chas. J. Buchheit.
Theodore L. Popp.
Albert Hinman
Jesse Hinman, Inventors.
By Wilhelm Bonner
Attorneys.

UNITED STATES PATENT OFFICE.

ALBERT HINMAN, OF FRIENDSHIP, AND JESSE HINMAN, OF WEST ALMOND, NEW YORK.

SEEDING-MACHINE.

SPECIFICATION forming part of Letters Patent No. 348,213, dated August 31, 1886.

Application filed July 6, 1885. Serial No. 170,740. (No model.)

*To all whom it may concern:*

Be it known that we, ALBERT HINMAN, of Friendship, and JESSE HINMAN, of West Almond, both in the county of Allegany and State of New York, have invented new and useful Improvements in Seeding-Machines, of which the following is a specification.

This invention relates to an improvement in that class of seeding-machines which are provided with a seed-receptacle from which the seed is discharged at regular intervals by a revolving seed-wheel into a tube which conducts the seed into the ground.

The object of this invention is to so construct the seed-wheel that the machine can be advantageously used for planting potatoes, and that by a simple adjustment the seed-wheel can be adapted for planting corn, beans, &c., also to improve the mechanism whereby the seed-wheel is rotated, also to improve the devices whereby the seed mechanism is thrown in and out of gear, and also to improve the devices whereby the seed-tubes and plows are raised and lowered.

Our invention consists to these ends of the improvements which will be hereinafter fully set forth, and pointed out in the claims.

Figure 1:
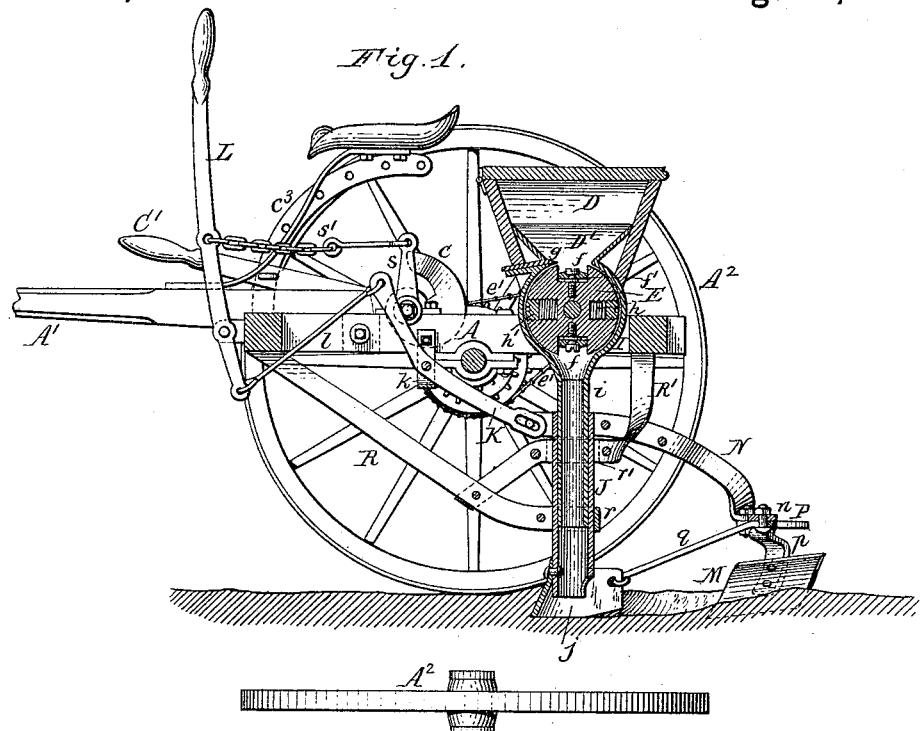
Figure 2:
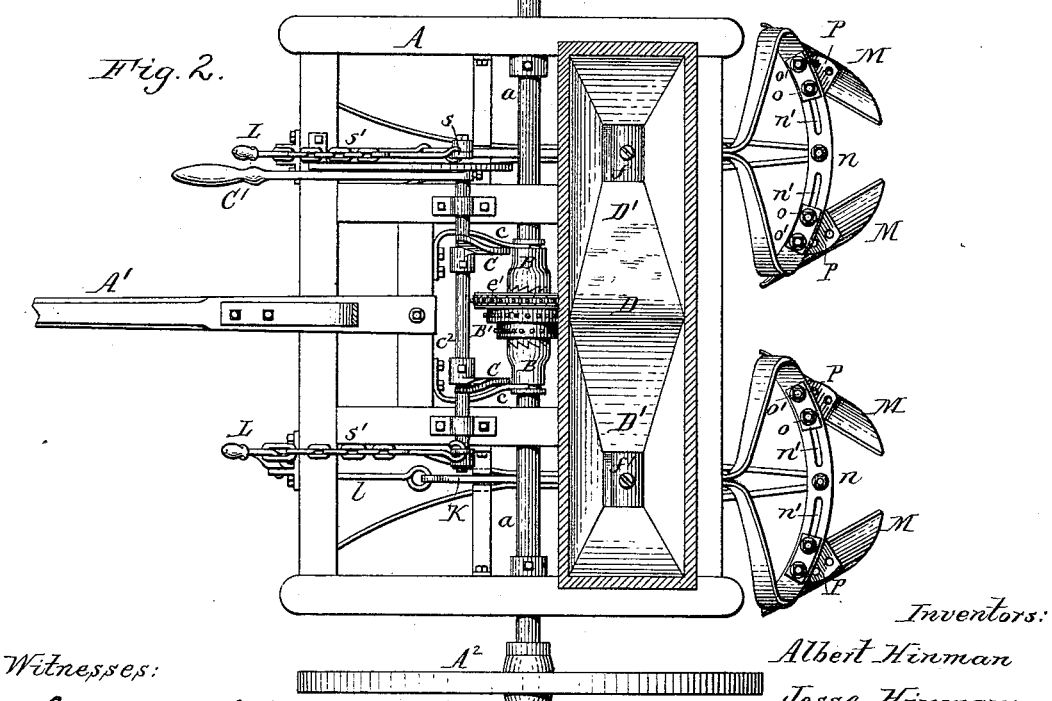

In the accompanying drawings consisting of two sheets, Figure 1 is a longitudinal sectional elevation of a seeding-machine provided with our improvements. Fig. 2 is a top plan view of the same. Fig. 3 is a vertical section of the seed-receptacle and connecting parts looking forward. Fig. 4 is a sectional elevation of the uncoupling mechanism on an enlarged scale. Fig. 5 is a sectional elevation of the seed-wheel on an enlarged scale. Fig. 6 is a perspective view of the seed-wheel. Fig. 7 is a detached plan view of the coupling-sleeves and connecting parts.

Like letters of reference refer to like parts in the several figures.

A represents the frame of the machine provided with a draft-pole or tongue, A', and supported on wheels $A^2$. The latter are each attached to a short axle, $a$, which is journaled in bearings $a'$, secured to the under side of the frame A.

B B represent sliding sleeves mounted on the inner ends of the axles $a$, and $b$ is a short axle or shaft which is arranged between the inner ends of the axles $a$ and in line with the same. The sleeves B move on feathers on the axles $a$, and the shaft $b$ turns loosely in the sleeves B.

B' is a step-pulley secured to the shaft $b$, between the sleeves B, and provided on both sides with ratchet rims or clutches $b'$, which engage with similar rims, $b^2$, formed on the inner ends of the sleeves B. By moving the sleeves B inwardly their clutch ends $b^2$ engage with the ratchet-rims $b'$ of the pulley B' and cause the latter to turn with the axles $a$, while upon moving the sleeves outwardly the pulley B' is disconnected from the axles and permitted to turn loosely in the sleeves B.

$c$ represents springs which are secured to the frame A and engage in annular grooves $c'$, formed in the sleeves B, and hold the latter inwardly in engagement with the pulley B'.

C represents cams, which are mounted on a horizontal shaft, $c^2$, journaled in the frame A in front of the pulley B', and which engage against the inner sides of the springs $c$. The shaft $c^2$ is provided with a hand-lever, C', for turning it. The cams C are so shaped as to move the sleeves B outwardly and throw them out of gear upon turning the hand-lever C' upwardly, and to release the sleeves and permit them to be thrown into gear by the springs $c$ upon lowering the hand-lever to the position represented in Figs. 1 and 2. The springs $c$ and ratchets permit each wheel to turn backwardly without interfering with the seeding mechanism. The hand-lever C' is secured in position by a bolt passing through a slotted or perforated segment, $c^3$.

D represents the seed-receptacle, secured to the frame A, in the rear of the pulley B', and provided with two seed-hoppers, D'.

E represents the seed-wheels, arranged in the outlets of the seed-hoppers and secured to a horizontal shaft, $e$, which is provided between the seed-hoppers with a step-pulley, E'.

$e'$ is a drive-chain or belt, which runs around the pulleys B' and E' and communicates motion to the latter. By adjusting the drive-chain on the pulleys the speed of the seed-wheels can be increased or reduced in accordance with the requirements of the particular kind of seed which is planted.

$f$ represents large pockets or recesses formed in the face of each seed-wheel and made of the proper size to receive potatoes.

$f'$ is a movable false bottom or follower arranged in each pocket $f$, and made adjustable by screws $f^2$, so that the size of the pocket can be regulated by raising or lowering the follower $f'$.

$g$ is a knife secured to each seed-hopper D' at that side of its outlet toward which the seed-wheel rotates, and $g'$ is a knife secured to the rear side of the pocket $f$ in the seed-wheel, the edges of both knives being adjusted by suitable screws to run closely together. The potatoes which drop into the pocket $f$ are carried around with the seed-wheel, and the portions of the potatoes which project beyond the face of the seed-wheel are cut off by the knives.

$h$ represents smaller pockets formed in the seed-wheels between the pockets $f$, and designed for planting corn, beans, &c. These pockets are screw-threaded on their inner sides, and are provided with screw-threaded plugs $h'$, which can be adjusted in the pockets to regulate the size of the same. When the machine is used for planting potatoes, the plugs $h'$ are adjusted to be flush with the periphery of the seed-cylinder, so that only the pockets $f$ are used. When the machine is used for planting corn, beans, or other seeds, which require small pockets, the pockets $f$ are closed by adjusting the followers $f'$ to be flush with the periphery of the seed-wheels and the pockets $h$ are used. In this manner the machine is adapted to plant a variety of seeds.

$i$ represents the fixed tubes which depend from the casings I, in which the seed-wheels revolve, and J are the movable tubes which surround the fixed tubes and extend downward to the ground. The lower end of each tube J is provided with a U-shaped share, $j$, which enters the ground. The upper end of each tube J is attached to the rear arm of a lever, K, which is pivoted in a bracket or support, $k$, attached to the frame A. The front arm of the lever K is connected by a rod, $l$, with a hand-lever, L, which is pivoted to the main frame, so that by moving the hand-lever in one or the other direction the tube J is raised and lowered.

M represents two plow-shares arranged behind each tube J, to cover the seed, and attached by an arm, N, to the upper end of each tube J, so as to move vertically with the tube. The rear end of the arm N is provided with a horizontal segment or curved bar, $n$, to which the plows are adjustably attached by bolts passing through slots $n'$, so that the distance between the plows can be increased or reduced. Each plow is attached to the bar $n$ by two bolts, $o$ $o'$, which pass through a segmental plate, P, formed at the upper end of the plow-arm $p$, and resting against the under side of the bar $n$. Each plate P is provided with an opening for the inner bolt, $o$, and with a series of openings for the outer bolt, $o'$, so that the angle of each plow can be adjusted by turning the plate P on the bolt $o'$. The bar $n$ is connected with the share $j$ by braces $q$. The height of both sets of plows is adjusted simultaneously by adjusting the hand-lever L.

$r$ $r'$ represent tubular guides or collars, which embrace the movable tubes J, and are supported by arms R R', which are secured to the under side of the frame A.

$s$ represents arms secured to the ends of the cam-shaft $c^2$, and connected by chains or flexible connections $s'$ with the hand-levers L in such manner that upon raising the hand-lever C' to uncouple the sleeves B from the wheel B' the hand-levers L will be drawn backwardly, thereby raising the tubes J and the plows M clear of the ground at the same time that the seed-wheels are stopped by throwing the pulley B' out of gear, while each hand-lever L can be swung backwardly to raise the tubes J and plows M without disturbing the sleeves B. By this means the tubes J and plows M at each side of the machine can be raised independently when necessary for clearing an obstruction, while upon stopping the seed-wheels the tubes J and plows M at both sides of the machine will be raised at the same time by the same movement which throws the sleeves B out of gear.

We claim as our invention—

1. The combination, with the seed-hopper, of a seed-wheel having a pocket, $f$, a follower, $f'$, capable of a sliding movement in the pocket toward and from the periphery of the seed-wheel, and a screw, $f^2$, whereby the follower is adjusted, substantially as set forth.

2. The combination, with the seed-hopper and the vertical seed-wheel arranged below the same, and provided with a seed-pocket, a knife, $g'$, secured in the said wheel along the rear side of said pocket, and a stationary knife, $g$, secured to the seed-hopper with its edge in the seed-hopper in close proximity to the periphery of the seed-wheel, whereby the portion of the seed which projects from the pocket is cut off and retained in the seed-hopper, substantially as set forth.

3. The combination, with the frame A, seed-receptacle, and seed-wheel, of the fixed tube $i$, movable tube J, plows M, secured to the movable tube, hand-lever L, whereby the tube J and plows M are raised simultaneously, ratchet-sleeves B, pulley B', cams C, and hand-lever C', mounted on a shaft, $c^2$, and arms $s$, flexibly connected with the hand-lever L, whereby the tube J and plows M are raised by throwing the sleeves B out of gear, while the tube J and plows M can be raised without disturbing the sleeves B, substantially as set forth.

4. The combination, with the frame, seed-receptacle, and seed-wheel, of the fixed tube $i$, movable tube J, arm N, secured to the movable tube and provided with a horizontal slotted bar, $n$, two plows, M, having their arms $p$ provided with perforated plates P, and bolts $o$ $o'$, whereby the plows are adjustably secured to the bar $n$ and enabled to be adjusted toward and from each other, substantially as set forth.

Witness our hands this 25th day of June, 1885.

ALBERT HINMAN.
   JESSE HINMAN.

Witnesses:
 JOHN S. GILLIES,
 JOHN ADAMS.